United States Patent [19]

Wachholz et al.

[11] Patent Number: 4,713,211
[45] Date of Patent: Dec. 15, 1987

[54] HIGH TEMPERATURE PEBBLE BED REACTOR AND PROCESS FOR SHUT-DOWN

[75] Inventors: Winfried Wachholz, Gorxheimer Tal; Ulricht Weicht, Weinheim, both of Fed. Rep. of Germany

[73] Assignee: Hochtemperatur-Reaktorbau GmbH, Fed. Rep. of Germany

[21] Appl. No.: 655,420

[22] Filed: Sep. 28, 1984

[30] Foreign Application Priority Data

Sep. 29, 1983 [DE] Fed. Rep. of Germany ....... 3335269

[51] Int. Cl.⁴ .............................................. G21C 7/08
[52] U.S. Cl. .................................. 376/238; 376/244; 376/299
[58] Field of Search ............... 376/219, 226, 236, 238, 376/244, 298, 299, 381

[56] References Cited

U.S. PATENT DOCUMENTS

| | | | |
|---|---|---|---|
| 2,812,303 | 11/1957 | Daniels | 376/381 |
| 4,148,685 | 4/1979 | Brandes | 376/226 |
| 4,382,908 | 5/1983 | Petersen | 376/299 |
| 4,486,380 | 12/1984 | Schweiger et al. | 376/244 |

FOREIGN PATENT DOCUMENTS

| | | |
|---|---|---|
| 2451748 | 5/1976 | Fed. Rep. of Germany . |
| 2752028 | 5/1979 | Fed. Rep. of Germany ...... 376/238 |
| 3141734 | 4/1983 | Fed. Rep. of Germany . |
| 3212264 | 10/1983 | Fed. Rep. of Germany . |
| 3212322 | 10/1983 | Fed. Rep. of Germany . |

*Primary Examiner*—Deborah L. Kyle
*Assistant Examiner*—Richard W. Wendtland
*Attorney, Agent, or Firm*—Robert J. Koch

[57] ABSTRACT

A high temperature pebble bed nuclear reactor having a medium power capacity of 300 to 500 MW$^e$ is equipped with two different shut-down arrangements comprising reflector rods used exclusively for scram. The total shut-down reactivity of the reflector rods is proportioned in order to prevent the excessive cooling of the reactor core folowing scram. In this manner, the reactor core is rendered subcritical (in the event of accidents, for example, or at the beginning of any operating state) yet capable of returning to criticality at a reduced level of temperature and power output following the removal of heat. The use of all of the reflector rods for scram is effected only in the event of reactivity accidents. For all other scram incidents, only a portion of the reflector rods are used.

5 Claims, 1 Drawing Figure

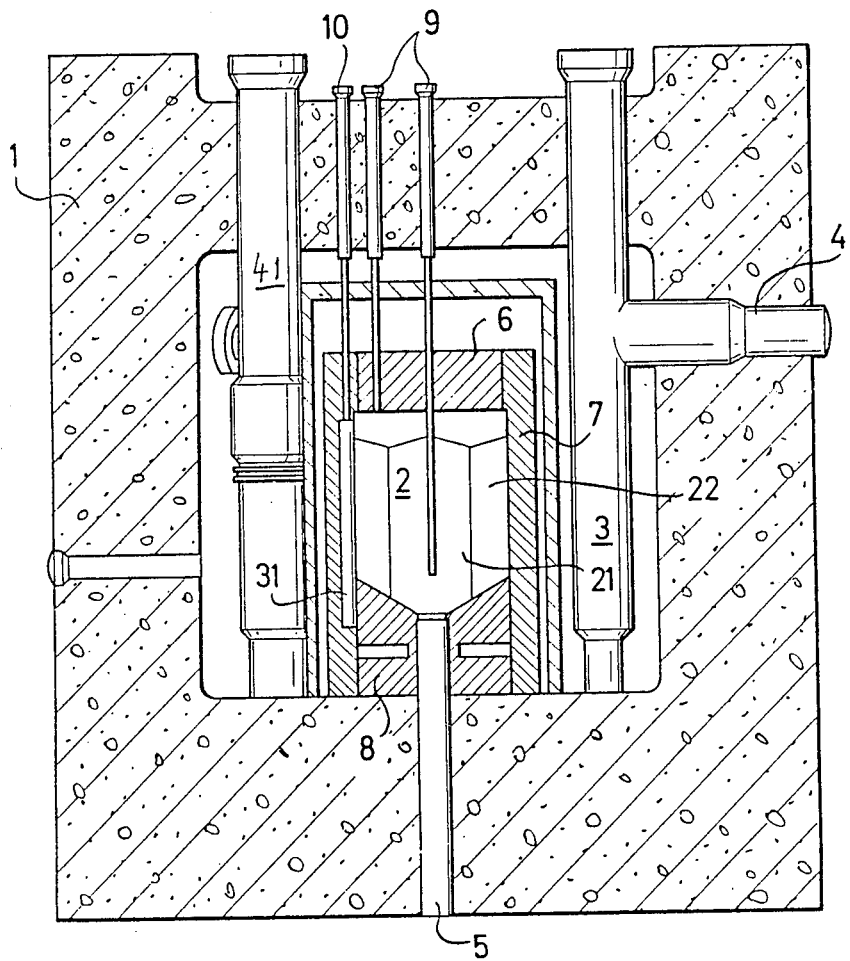

HIGH TEMPERATURE PEBBLE BED REACTOR AND PROCESS FOR SHUT-DOWN

BACKGROUND OF THE INVENTION

1. Field of the Invention

The invention relates to a high temperature pebble bed reactor having a reflector surrounding the core on all sides with means to remove the decay heat and with two different means for its shut-down. The first shut-down means comprises a plurality of absorber rods for insertion into the core for extended shut-down. The second shut-down means comprises a plurality of absorber rods displaceable in orifices in the lateral reflector for rapid shut-down or scram. The invention also provides for a process for the shut-down of the high temperature reactor.

2. Background of the Art

In general, high temperature reactors with spherical fuel elements are equipped with a shut-down and control system, which consists of a large number of core rods and/or reflector rods and whereby all operating and accidental events are safely controlled in the reactor. The choice of the group of absorbers to be used for the different shut-down functions (scram or long term shut-down), depends essentially on the capacity of the high temperature reactor involved.

Thus, in the case of the THTR-300MW$_{el}$ prototype, all shut-down processes are effected by means of the core rods while the reflector rods are intended for the reactor control processes. An example of such an arrangement is described in detail in U.S. Pat. No. 4,148,685, the disclosure of which is incorporated herein. In order to satisfy the prevailing high safety requirements, an emergency shut-down system is further available for use only if the core rods are not capable of operation (for example in the event of external accidents, such as the crash of an aircraft into the reactor structure). This emergency shut-down system comprises the introduction of a neutron absorbing gas or of small absorber pebbles into the core of the reactor.

A high temperature reactor for an intermediate capacity range (300 to 500 MW$_{el}$), described in West German Offenlegungsschrift No. 3141734, is also equipped with a first shut-down system formed by the core rods and a second emergency shut-down system consisting of small absorber pebbles. The second shut-down system is used only in case of a failure of the first system.

A further high temperature reactor of the intermediate power range is described in West German patent application No. P3212322.1. Here again, a first shut-down system, consisting of absorber rods and a second shut-down system of small absorber pebbles to be used in case of the failure of the first shut-down system, are provided. In this reactor the first shut-down system comprises, in addition to the core rods, a number of reflector rods.

In high temperature reactors with a small power capacity (100 to 200 MW$_{el}$), only reflector rods are required for the shut-down of the cores, which thus form the first shut-down system. Such a small high temperature reactor is described in West German application No. 3212264.0. The reflector rods, which are inserted from below into bore holes of the lateral reflector, perform both the scram and the long term shut-downs. A second shut-down system, here again consisting of small absorber pebbles, is actuated only upon a failure of the first system and, it effects a long term shut-down of the reactor.

A common feature of the aforedescribed high temperature reactors is that upon the failure of the first shut-down system a measure is actuated, which is afflicted by certain disadvantages. The feeding of absorbing agents into the reactor core, for example, leads to extended downtimes, due to the fact that the removal of the absorbing agent is very expensive. Furthermore, in addition to the absorber rods, supplemental absorber materials must be made available.

In another high temperature reactor known from West German Offenlegungsschrift No. 2451748, the introduction of absorber materials in the form of a gas or small pebbles is eliminated. This reactor possesses two different shut-down systems of which, one consists of core rods and effects long term shut-downs, while the other comprises a predetermined number of reflector rods whereby a scram is performed. In case of a failure of the reflector rods, a long term shut-down is actuated by means of the core rods. The shut-down reactivity of the reflector rods intended for a rapid shut-down is designed so that the reactor in all accident situations may be maintained subcritical for at least 30 minutes. This takes into consideration the fact that the reactor is being cooled to a greater or lesser extent by the principal cooling systems or the decay heat removing installations (in an extreme case down to the cold gas temperature); i.e. in relation to the negative temperature coefficient of high temperature reactors, there is overall a very high shut-down reactivity requirement. Furthermore, the reheating of the core after cooling involves a significant loss of time during the reactivation of the core to full power. Finally, the core installations are exposed to high thermal stresses during the change in temperature. Here again, the shut-down concept proposed is applicable only to high temperature reactors with a power range up to 300 MW$_{el}$.

SUMMARY OF THE INVENTION

It is an object of the invention to provide a high temperature reactor having an intermediate power capacity of 300 to 500 MW$_{el}$, wherein a rapid shut-down or scram may be effected with reflector rods alone without causing excessive cooling of the core following a rapid shut-down.

This object is attained according to the invention by proportioning the total shut-down reactivity of all of the reflector rods so that the reactor core, in the case of any accidental event including reactivity incidents and in all operating states, may be made subcritical and that the reactor will again pass to the critical state on a lower temperature and power level in case of a reactivity accident in combination with an unfavorable operational state, following the removal of heat.

The high temperature reactor according to the invention may thus be placed in a safe state, even if a reactivity accident is present. An example of such an accident would be the incursion of water into the reactor. By means of the removal of decay heat following a rapid shut-down through the principal cooling systems or the decay heat removing installations, the temperature of the core is reduced to a predetermined value, while by temperature recycling (negative temperature coefficient), reactivity is again released and the reactor becomes critical at this reduced temperature level (approx. 500° C.). This leads to an extended stabilization of the reactor at a lower power level, the value of which is determined by the heat removed from the core. This state of the reactor and the resulting thermal stress in the decay heat removing devices, as appropriately designed, is permissible for an arbitrary period of time. The given limiting values are not exceeded and the environment cannot be endangered.

BRIEF DESCRIPTION OF THE DRAWING

The shut-down concept proposed can be accomplished advantageously in view of the system's inherent properties of a high temperature reactor. Such advantageous properties include the core having a high thermal capacity and strength at elevated temperatures and a sluggish temperature-time behavior (slow change in temperature in case of a heat generation/heat removal disturbance).

An advantage of the high temperature reactor proposed, compared to the state of the art, comprises the fact that a lesser number of reflector rods is sufficient to satisfy the requirements of the scram process so that overall investment costs are reduced. Furthermore, since the core and the steam generators remain hot, a rapid reactivation of the reactor (hot start) becomes possible following the removal of the cause of the incident. It is a further advantage that the thermal stressing of the core installations and loop components by rapidly changing temperatures is appreciably reduced.

In a further development of the invention, a shut-down process is used in the aforedescribed high temperature reactor, whereby scram using all of the reflector rods is effected only in case of reactivity accidents, while for operational shut-downs and other incidents, only part of the reflector rods, preferably one-third to one-half, is employed.

By means of this process in case of a scram from normal operation and without a preceding incident, temperatures may be maintained within a range close to normal operation. This would not be true if all of the reflector rods would be inserted. As opposed to the resulting strong subcriticality of the reactor core after insertion of all reflector rods, the shut-down reactivity of the reflector rods, according to the invention, is dimensioned so that even in the case of the least favorable operating state (i.e. following a cold start) it will cover the maximum accident reactivity of an incursion of water.

Following a rapid shut-down, the reactor core may be raised to full power following the removal of the interference after it has again become critical at a lower temperature and power level. On the other hand, a long term shut-down may be effected with the aid of the core rods, if the cause of the rapid shut-down cannot be eliminated in time. For this purpose, the core rods are inserted fully. The use of the core rods will become necessary only after approx. 10 hours, so that the period of time available for counter measures is relatively long.

The FIGURE illustrates a pebble bed reactor used in the practice of the present invention. The reactor comprises a prestressed concrete vessel 1, a reactor core 2, several steam generators 3, and associated cooling gas blowers 4 which circulate cooling gas through the steam generators 3 enclosed within the pressure vessel. The reactor core 2 includes a pile of spherical fuel elements which are introduced into the core 2 by means of a feeding device (not shown) and which leave the core through a discharge duct 5. The reactor may be operated in accordance with the so-called multi-pass process or the single-pass process.

Several steam generators 3 arranged at regular angular intervals surround the core 2. Several means 41 for removal of decay heat are disposed between the steam generators. The core 2 is enclosed within a reflector structure, comprised of a top or cover reflector 6, a generally cylindrical side wall reflector 7, and a bottom reflector 8. Control and adjustment maneuvers for the operation of the reactor are performed by means of core rods 9 and reflector rods 10. The core rods 9, which can be raised and lowered, penetrate directly into the pebble bed inside core 2. Unlike the core rods 9, the reflector rods 10 are accommodated inside special openings 31 arranged in the cylindrical wall of the side wall reflector 7. The core rods may have a pneumatic type vertical drive mechanism. The reflector rods 10 are driven electrically. The driving means for core rods 9 and reflector rods 10 operate independently of each other.

The core 2 is a multi-zone core with a first inner zone 21 and a second outer zone 22. The combustion or fuel elements of the outer zone 22 have a high content of fissionable material than the combustion elements of the inner zone, so that the radial neutron flow is higher in the area of the outer zone 22.

The invention will become more apparent from the example described hereinafter.

EXAMPLE

A high temperature reactor with a power capacity of 500 $MW_{el}$, is operated with spherical fuel elements in a single passage mode such that an axial neutron flow density is established with a maximum in the upper third of the core, which then declines in an approximately exponential manner. The core reactor has two different shut-down installations: (1) core rods for long term shut-downs and, (2) reflector rods for scram. The heat produced in the core is removed by several principal cooling systems. In case of an accident involving the failure of the principal cooling systems, the decay heat is removed by several auxiliary cooling systems.

The total shut-down reactivity of the reflector rods is dimensioned so that the reactor may be rendered subcritical, in the case of any incident and beginning with any operating state, and maintained in a subcritical condition until a temperature level clearly less than the normal operating value is attained.

Reactivity estimates for a high temperature reactor with a power capacity of 500 $MW_{el}$ yields the following efficiency of all of the reflector rods (less the failure of the most effective rod) for the individual conditions of the plant:

| | |
|---|---|
| normal operation (100% full load) | 2.6% $\Delta K/K$ |
| cold start | 2.1% $\Delta K/K$ |
| load cycle | 2.3–3.1% $\Delta K/K$ |

The maximum accident reactivity (incursion of water) amounts to approx. 1.1% $\Delta K/K$, so that, depending on the initial situation, by the insertion of the reflector rods following a reactivity accident, a subcriticality of 1.0 to 2.0% $\Delta K/K$ is obtained. Without such an accident, a subcriticality of roughly 2 to 3% $\Delta K/K$ is attained. In cases such as operational shut-downs and incidents without an increase in reactivity, therefore, the number of rods employed for the rapid shut-down may be reduced. Consequently, the shut-down process according to the invention requires that all of the reflector rods be inserted only in the case of reactivity accidents.

Following a scram and removal of the decay heat by means of the principal or auxiliary cooling systems, the reactor again becomes critical at a reduced temperature level and with a low power output, as a function of the shut-down reactivity introduced and the initial operational state. This state is permissible for the reactor installation over an arbitrary period of time. The reactor is operated for extended periods of time cold and subcritically if conditions are not conducive for a rapid resumption of its normal operation, as the result of the onset of the decay of iodine and the concentration of xenon associated with it, or by the insertion of core rods.

The above description describes a preferred embodiment of the invention. It is to be understood however, that the invention is not limited to any single embodiment or feature, but should be construed to cover all modifications and alternative embodiments falling within the scope of the invention as defined by the claims which follow.

What is claimed is:

1. A process for the shutdown of a high temperature pebble-bed nuclear reactor having a core of spherical fuel elements, a reflector surrounding the core comprising a top reflector, a side reflector and a bottom reflector, means for the removal of decay heat, means for shutdown of the reactor over an extended period of time comprising at least one first absorber rod removably displaceable into the core of the reactor, and means for the rapid shutdown of the reactor comprising a plurality of second absorber rods removably displaceable into the side reflector of the reactor, the shutdown reactivity of said second absorber rods being such that the reactor may be reduced to a subcritical state under any condition by insertion of same into said side reflector, the process for shutdown of the reactor for all non-reactivity accidents comprising displacing only that portion of said second absorber rods into said side reflector which is sufficient to reduce the reactor to a subcritical state, the shutdown reactivity of said second absorber rods being such that only a portion of the total plurality of said absorber rods is required to achieve a subcritical state, removing decay heat to reduce the temperature of the reactor to a predetermined lower level and subsequently causing said reactor to become critical at said predetermined lower level.

2. The process of claim 1 wherein said predetermined temperature level is approximately 500° C.

3. The process of claim 1 wherein said reactor possesses a power capacity of from 300 to 500 $MW_{el}$.

4. The process of claim 1 wherein all of the reflector rods are inserted into the reflector in the event of a reactivity accident.

5. The process of claim 1 wherein about one third to one half of the reflector rods are inserted into the reflector for an operational shut-down or nonreactivity accident.

* * * * *